United States Patent [19]
Frisk

[11] Patent Number: 5,395,284
[45] Date of Patent: Mar. 7, 1995

[54] BIG GAME HOIST

[76] Inventor: Mark D. Frisk, Rte. 1 Box 438-B, Motley, Minn. 56466

[21] Appl. No.: 970,047

[22] Filed: Nov. 2, 1992

[51] Int. Cl.$^6$ .............................................. A22B 5/16
[52] U.S. Cl. ................................................... 452/187
[58] Field of Search ..................... 452/187, 185, 189; 254/325, 334, 131, 133 R, 373, 375

[56] References Cited

U.S. PATENT DOCUMENTS

| | | | |
|---|---|---|---|
| 3,854,168 | 12/1974 | Bradley | 452/189 |
| 4,338,703 | 7/1982 | Tanner | 452/187 |
| 4,806,063 | 2/1989 | York | 452/187 |
| 4,903,372 | 2/1990 | Jones | 452/187 |
| 5,049,110 | 9/1991 | Owens | 452/189 |
| 5,211,601 | 5/1993 | Cope | 452/187 |

Primary Examiner—Willis Little

[57] ABSTRACT

A big game hoisting tool comprising a handle supporting a winch which acts on a line running over a pulley at the end of a telescoping adjustable handle that can be hooked over a tree limb or any overhead structure making it a completely portable device.

4 Claims, 1 Drawing Sheet

BIG GAME HOIST

BACKGROUND OF THE INVENTION

The present invention relates generally to the art of dressing out big game wildlife, and in particular to the art of hoisting the carcass up for the purpose of skinning and cleaning out the internal organs and for hanging the carcass for cooling.

In this art it is necessary to hang and hold the big game animal up after it is harvested, for purposes of skinning, cleaning, and curing the meat. The present invention allows the user to do this operation whether it be at home, in a garage, out in the field under a tree, or a designated meat pole at a deer camp; without first having to climb up to attach a pulley or secure a lifting device such as a winch, or assemble and fasten a derrick type hoist with the aid of a motor vehicle. This is of considerable value to the sportsman for safety of not having to climb or reach the point of attachment that other hoisting devices employ. This also enables the user of the this hoist to lift the animal by himself without the need of assistance.

Techniques, such as the use of permanently installed pulleys and winch lifting systems have been used effectively in the past. Also, other similar devices have been used, but are also permanent in nature and operate significantly different from the present invention. The previously used techniques have been cumbersome and are not readily handy to the sportsman. Often times hunters are by themselves or they do not have access to these permanently installed or vehicle mounted devices when they are hunting and working with the big game animal.

Other devices that have been used for this purpose are shown in such periodicals as Cabela's and other mail order sportsman catalogs. In such, are old and well known devices such as a "block and tackle", a "come-along", and pickup truck installed lift cranes or derricks. Four prior art patents are known that describe pickup truck or motor vehicle installed lift cranes or derricks. U.S. Pat. No. 3,854,168 to Bradley is a boom that must be attached by two means of support to a motor vehicle, or the trunk or the vertical portion of a tree to offset the weight of the big game animal being lifted. U.S. Pat. No. 4,903,372 to Jones and U.S. Pat. No. 4,806,063 to York shows a boom type derrick that relies solely on three points of attachment to a truck or motor vehicle for support to offset the weight of the big game animal which is being lifted. U.S. Pat. No. 4,338,703 to Tanner shows a overhead supporting device which can be rotated, yet must be supported to the side wall, or fastened rigidly to the bumper of a pickup or motor vehicle. Also, it is common practice to install a pulley and winch system in a garage or in the wild to perform the task. In each of these cases portability and convenience of attachment is lacking. With other types of lifting mechanisms it is necessary to climb to the point of attachment before use. Also it my be necessary to drag the big game animal to the lifting apparatus.

The present invention represents a major advance in the art of hoisting and hanging big game animals. In the past, hunters have not been able to do this without the use of permanently installed tools, or without first climbing up to the point of attachment or anchor point. The present invention is simple to use and after hanging the carcass, enables the hunter to walk freely around for case of skinning and cleaning.

SUMMARY

The general operation of the present invention is described herein to provide an understanding of the overall invention. This is a device for use by a hunter in lifting and supporting a big game animal in order that it can be skinned, cleaned, cured and/or loaded for transporting.

In the general operation of the present invention, after the big game animal has been harvested and field dressed, the user of the invention places the hook end, which contains a pulley, over a support, such as a tree limb or an exposed rafter or horizontal attachment member in a garage or building. The user of the present invention is able to release or lower a line with permanently fastened hook for attachment to the big game animal below by means of a hand operated winch. The line, once lowered to the carcass, may be hooked to a strap around the neck or antlers, to hoist the carcass head first. The line may also be attached to the big game animal by means of a gambrel, to lift the carcass legs first in a head down position, this would be the preference of the individual hunter. Then by use of the hand winch at the handle end of the tool, the carcass is easily lifted. After hoisting and having the carcass at the desired height, the winch is locked and the handle end of the present invention can be let free and allowed to hang naturally along side of the carcass without additional support. The present inventions design is such that the weighted point is between the fulcrum and the handle, additional supports such a straps or cables isn't necessary for support.

A feature of the present invention is its ability to be used without having to climb to attach a device or tic up a support to an anchor point. The user of this Big Game Hoist can attach to a supporting member and is able to use, from ground level.

A further feature of the present invention is the multiple sided support hook end which is designed to offset the rolling tendency while lifting, by providing two points of contact within the radius of the support hook, to the round tree limb while the hoist is at normal user angle of 45 degrees. The multiple sided support hook is also designed to be used on a flat horizontal support member such as a rafter in a garage or building. At the normal user angle of 45 degrees a portion of the multiple sided support hook is so designed to rest flat on the top side of the rafter or supporting member to keep to hoist from twisting or rolling in the users hands when cranking. This feature is further enhanced by the addition of a handle integrated into the proximal end of the hoist opposite the winches crank handle.

Another feature of the present invention is its ability to be collapsed for carrying and storage.

Another feature of the present invention is its design geometry which places the load between the fulcrum support and the handle, allowing the user to let go of the handle after the hoisting operation is complete. This feature is further refined by a hole provided in the handle which may be used to "tie-off" the handle of the invention in order to move the Big Game Hoist to the side which will provide clear work space for skinning or butchering.

An object of the present invention is to provide an easier and more readily available means of lifting a big game animal.

It is anticipated that certain changes related to the size and shape and method of construction of the present invention can be made without appreciably departing from the present invention. It is also anticipated that certain components may be joined together or integrated to offer a variety of advantages without departing from the present invention.

DETAILED DESCRIPTION OF THE PREFERRED EMBODIMENT

Figure 1:
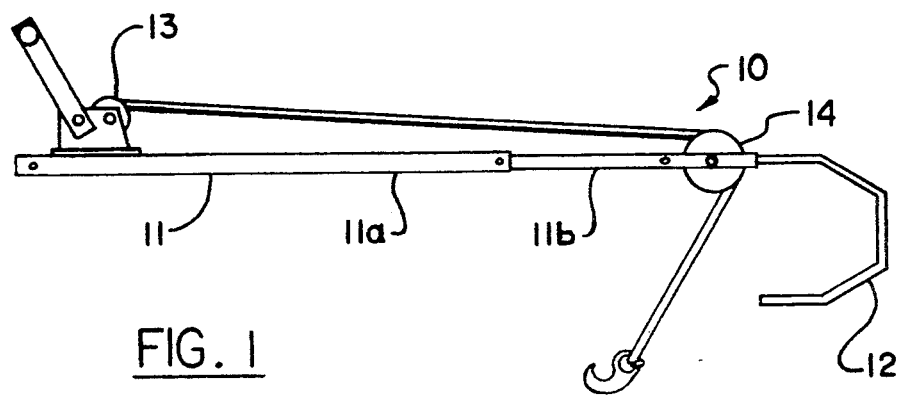
FIG. 1 is a side view of the present invention.

The present invention herein is generally described as a big game hoisting tool, 10, which, referring to FIG. 1, consists of four parts. The elongated body portion, 11, the hook, 12, the winch, 13, and the pulley, 14, make up the tool and are integrated into one another. The elongated body portion, 11, further consists of a proximal end, 11a, and a distal end, 11b. The proximal end, 11a, defines a main handle portion and supports the winch, 13, and opposite the winch, an offset handle, 15. Also integrated into the proximal end is a tie-off hole, 16.

The distal end, 11b, of the handle supports the multiple sided hook, 12, and the pulley, 14. The proximal and distal ends are slideably received within one another to allow the tool to have a collapsed length and an extended length. A cross pin, 17, is used to retain the tool in extended or collapsed length by way of cross hole, 20, and mating cross holes, 21a and 21b.

Figure 2:
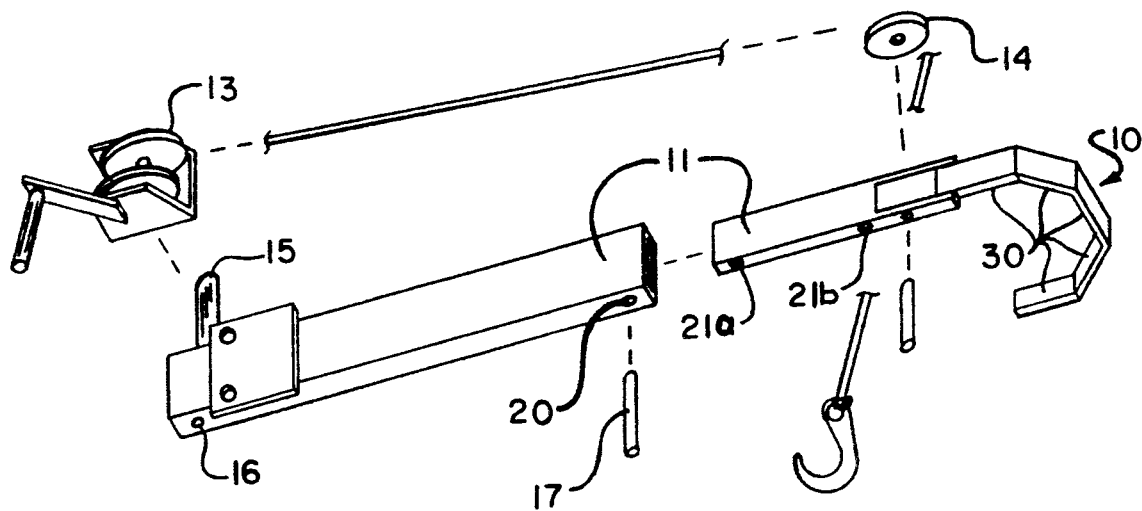
FIG. 2 is an exploded view of the preferred embodiment of the present intention.
Figure 3:
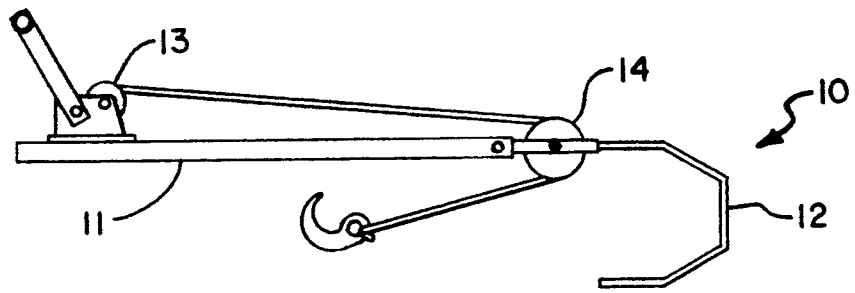
FIG. 3 is a collapsed side view of the present invention.

Referring to FIG. 2, the hook has many sides, 30, and is integrated into the distal end, outward of the pulley, 14. Using the handle, in the extended length, the user can reach significantly high and hook a ground support such as a tree limb. Using the winch, the line can be released and lowered to the big game animal below. By winch operation, acting on a lifting line routed over the pulley in the distal end of the handle, the animal is hoisted up. After hoisting the handle can be locked and allowed to dangle or it can be tied-off clear of the carcass to provide work space.

That which is claimed is:

1. A big game hoisting tool comprising:

an elongated body portion having a proximal end and a distal end; said proximal end defining a main handle portion for holding said tool;

a winch attached to said elongated body portion adjacent said proximal end;

a pulley attached to said elongated body portion adjacent said distal end;

a cable extending from said winch and over on said pulley; said cable having attachment means at the free end thereof for connecting said cable to a predetermined part of the game to be hoisted; and a multiple sided support hook attached to said elongated body portion at said distal end for suspending said tool from an overhead support; said support hook providing at least two points of contact with its interior radius and said overhead support to prevent said handle portion from twisting or rolling in a user's hand while cranking said winch to hoist said game.

2. The device of claim 1, wherein the elongated body further supports an offset handle adjacent its proximal end and opposite the winch handle for helping the user to stabilize the tool while cranking said winch to hoist said game.

3. The device of claim 1, wherein a tie-off hole is located in the elongated body portion adjacent its proximal end for tying the tool aside to provide a clear work space for skinning or butchering the game after being hoisted.

4. The device of claim 1, wherein the elongated body portion comprises at least two telescopic members.

* * * * *